United States Patent
Smith et al.

(10) Patent No.: US 9,628,477 B2
(45) Date of Patent: Apr. 18, 2017

(54) USER PROFILE SELECTION USING CONTEXTUAL AUTHENTICATION

(71) Applicant: INTEL CORPORATION, Santa Clara, CA (US)

(72) Inventors: Ned M. Smith, Beaverton, OR (US); Hannah L. Scurfield, London (GB); Nathan Heldt-Sheller, Portland, OR (US); Micah J. Sheller, Hillsboro, OR (US); Nathaniel J. Goss, Portland, OR (US); Kevin C. Wells, Portland, OR (US); Sindhu Pandian, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/581,659

(22) Filed: Dec. 23, 2014

(65) Prior Publication Data

US 2016/0182502 A1    Jun. 23, 2016

(51) Int. Cl.
*G06F 7/04*        (2006.01)
*G06F 15/16*    (2006.01)
(Continued)

(52) U.S. Cl.
CPC ........ *H04L 63/0861* (2013.01); *G06F 21/316* (2013.01); *G06N 99/005* (2013.01)

(58) Field of Classification Search
CPC .......................... H04L 63/0861; G06N 99/005
(Continued)

(56) References Cited

U.S. PATENT DOCUMENTS

| | | | | |
|---|---|---|---|---|
| 8,079,079 B2* | 12/2011 | Zhang | ..................... | G06F 21/32 706/48 |
| 2007/0005988 A1* | 1/2007 | Zhang | ..................... | G06F 21/32 713/186 |

(Continued)

FOREIGN PATENT DOCUMENTS

WO    WO2014/142947 A1    9/2014

OTHER PUBLICATIONS

Anil K. Jain; An Introduction to Biometric Recognition; IEEE Transactions on Circuits and Systems for Video Technology, vol. 14, No. 1, Jan. 2004.*

(Continued)

*Primary Examiner* — Monjour Rahim
(74) *Attorney, Agent, or Firm* — Schwabe, Williamson & Wyatt, P.C.

(57) ABSTRACT

In embodiments, apparatuses, methods and storage media (transitory and non-transitory) are described that are associated with user profile selection using contextual authentication. In various embodiments, a first user of a computing device may be authenticated and have an access control state corresponding to a first user profile established, the computing device may select a second user profile based at least in part a changed user characteristic, and the computing device may present a resource based at least in part on the second user profile. In various embodiments, the computing device may include a sensor and a user profile may be selected based at least in part on an output of the sensor and a previously stored template generated by a machine learning classifier.

18 Claims, 7 Drawing Sheets

(51) Int. Cl.
*G06F 17/30* (2006.01)
*H04L 29/06* (2006.01)
*G06N 99/00* (2010.01)
*G06F 21/31* (2013.01)

(58) Field of Classification Search
USPC .......................................................... 726/7
See application file for complete search history.

(56) References Cited

U.S. PATENT DOCUMENTS

| | | | | |
|---|---|---|---|---|
| 2014/0096215 A1* | 4/2014 | Hessler | ............... | H04L 63/0869 |
| | | | | 726/7 |
| 2014/0282877 A1* | 9/2014 | Mahaffey | ............ | H04L 63/0853 |
| | | | | 726/3 |
| 2015/0033305 A1* | 1/2015 | Shear | ...................... | G06F 21/45 |
| | | | | 726/6 |
| 2015/0286813 A1* | 10/2015 | Jakobsson | ............... | G06F 21/35 |
| | | | | 726/9 |

OTHER PUBLICATIONS

Ned M. Smith, et al. "Adding Nontraditional Authentication to Android", 2014, 18 pages, Intel Technology Journal, vol. 8, Issue 4.

* cited by examiner

USER PROFILE SELECTION USING CONTEXTUAL AUTHENTICATION

TECHNICAL FIELD

The present disclosure relates to the field of data processing, in particular, to presentation of resource (e.g., content) based at least in part on a user profile selected by contextual authentication.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Some computing devices, such as tablet computers, are dynamically shared between multiple users. User profiles allow each user to have a more personalized user experience by allowing each user to have their own set of applications, social logins, bookmarks, and data. They can also be used to create guest profiles, allowing others to borrow a device without worrying about application or social login conflicts and data privacy. Profiles can also be used to restrict content for use by children to allow parental control of browsing, application usage, and in-app purchasing. User profiles typically require additional active user input to switch from one profile to another which interrupts the flow of the user experience by requiring extra interaction from the user as they pick a profile to load and/or provide active authentication information such as a password.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the Figures of the accompanying drawings.

DETAILED DESCRIPTION

Figure 1:
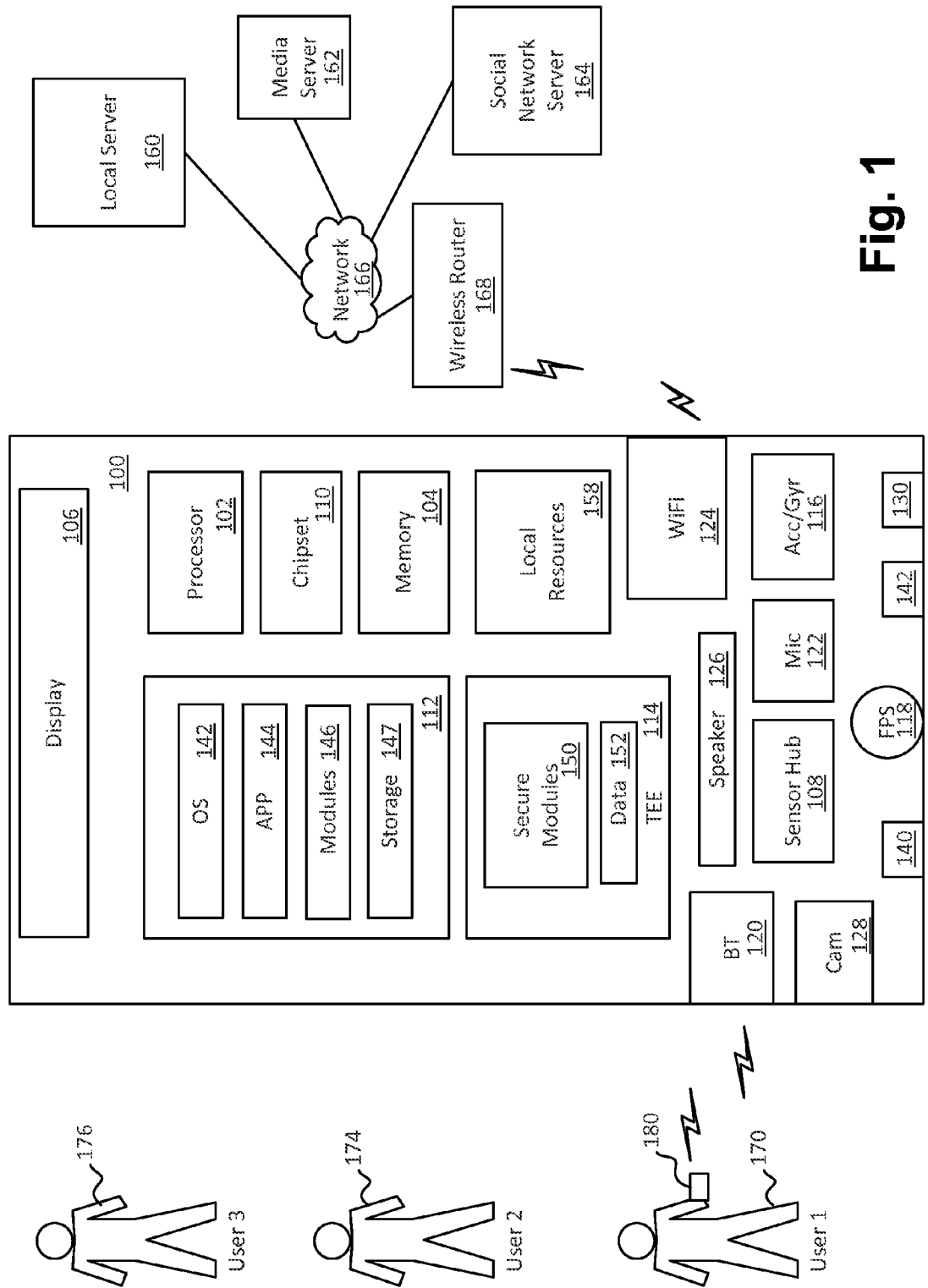
FIG. 1 is a block diagram of a computing device in an operating environment, in accordance with various embodiments.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "logic" and "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality. The term "module" may refer to software, firmware and/or circuitry that is/are configured to perform or cause the performance of one or more operations consistent with the present disclosure. Software may be embodied as a software package, code, instructions, instruction sets and/or data recorded on non-transitory computer readable storage mediums. Firmware may be embodied as code, instructions or instruction sets and/or data that are hard-coded (e.g., non-volatile) in memory devices. "Circuitry", as used in any embodiment herein, may comprise, for example, singly or in any combination, hardwired circuitry, programmable circuitry such as computer processors comprising one or more individual instruction processing cores, state machine circuitry, software and/or firmware that stores instructions executed by programmable circuitry. The modules may collectively or individually be embodied as circuitry that forms a part of a computing device. As used herein, the term "processor" may be a processor core.

Referring now to FIG. 1, a computing device 100, incorporated with the resource presentation teaching of the present disclosure, in accordance with various embodiments, is illustrated. As shown, computing device 100 may include a number of components 102-158, including shared application 144 and trusted execution environment (TEE) 114, configured to cooperate with each other, to select a user profile using contextual authentication and enable resources (such as contents) to be selectively consumed (viewed, modified, or deleted) by a logged-in user and/or a delegate user based at least in part on the selected user profile, alternatingly with ease. In embodiments, computing device 100 may include one or more processors or processor cores 102, system memory 104, a display 106, and a sensor layer including a sensor hub 108 that may be coupled together and configured to cooperate with each other. The display 106 may be a touch sensitive display that also serves as an input device in various embodiments. For purposes of this application, including the claims, the terms "processor" and "processor cores" may be considered synonymous, unless the context clearly requires otherwise. In embodiments, the sensor layer may include one or more sensor devices, an input/output (IO) subsystem having IO controllers, internet protocol (IP) blocks, and control logic. In embodiments, as shown, the computing device 100 may also include one or more chipsets 110, one or more execution environments 112, and one or more trusted execution environments (TEE) 114. The sensor layer may include trusted IO technology that hardens the IO path between the sensor hub 108 and/or sensor devices and the TEE 114.

Generally, a TEE is a secure environment that may run alongside an operating system and which can provide secure services to that operating system. More information regarding TEEs and the implementation thereof may be found in the TEE client application programming interface (API) specification v1.0, the TEE internal API (application programming interface) specification v1.0, and the TEE system architecture v1.0 issued by GlobalPlatform. In some embodiments, the devices described herein may include a TEE provided using one or more of virtualization technology, enhanced memory page protection, CPU cache as memory page protection, security co-processor technology, and combinations thereof. Non-limiting examples of such technology include INTEL® VT-x virtualization technology, INTEL® VT-d virtualization technology, INTEL® trusted execution technology (TXT), Xeon® internet security and acceleration (ISA) "cache as RAM", converged security engine (CSE) technology, converged security and manageability engine (CSME) technology, a security co-processor, manageability engine, trusted platform module, platform trust technology, ARM TRUSTZONE® technology, combinations thereof, and the like. The nature, advantages and limitations of each of these technologies are well understood and are therefore not described herein.

In various embodiments, the sensor hub 108 may be in signal communication with a motion sensor 116, a fingerprint sensor 118, a Bluetooth transceiver 120, a microphone 122, a wireless fidelity (WiFi) transceiver 124, a speaker 126, a camera 128, an ultrasonic sensor 130, and one or more other sensors 140 or input devices 142. In embodiments, the camera 128 may be a video camera. The motion sensor 116 may include an accelerometer or gyroscope in various embodiments. The WiFi transceiver 124 may operate according to at least one of the Institute of Electrical and Electronics Engineers (IEEE) 802.11 standards and the Bluetooth transceiver 120 may operate according to at least one of the standards defined by the Bluetooth Special Interest Group in various embodiments.

In embodiments, the execution environment 112 may include an operating system (OS) 142, earlier described shared application 144, and one or more modules 146. The execution environment 112 may also include storage 147 for various variables and resources. The earlier described TEE 114 may include secure modules 150 and data 152 in various embodiments. The shared application 144 and operating system 142 may, in cooperation with secure modules 150, enforce respective access rights simultaneously for a plurality of users. In embodiments, a continuous passively authenticated context may be maintained for each of the plurality of users.

In embodiments, the computing device 100 may be in data communication with a local server 160, a remote content server such as a media server 162, or a social network server 164 over a network 166 by communicating with a wireless router 168 using the WiFi transceiver 124. The shared application 144 may have access to resources that may be consumed (viewed, modified, or deleted) by a logged-in user and/or a delegate user. The resources may include local resources 158 stored on the computing device 100 or resources served or streamed by the local server 160, the media server 162, or the social network 164 in various embodiments. The resources may include other types of resources not shown in embodiments. The logged-in user may access the resources with a first set of resource access rights while a second delegate user may access the resources with a different set of access rights.

In various embodiments, the computing device 100 may be a shared device such as a tablet computing device that may be used e.g., by a first user 170, a second user 174, or a third user 176. In embodiments, one or more of the users may have a Bluetooth enabled device 180, which may e.g., be a wearable device on the first user 170.

Figure 2:
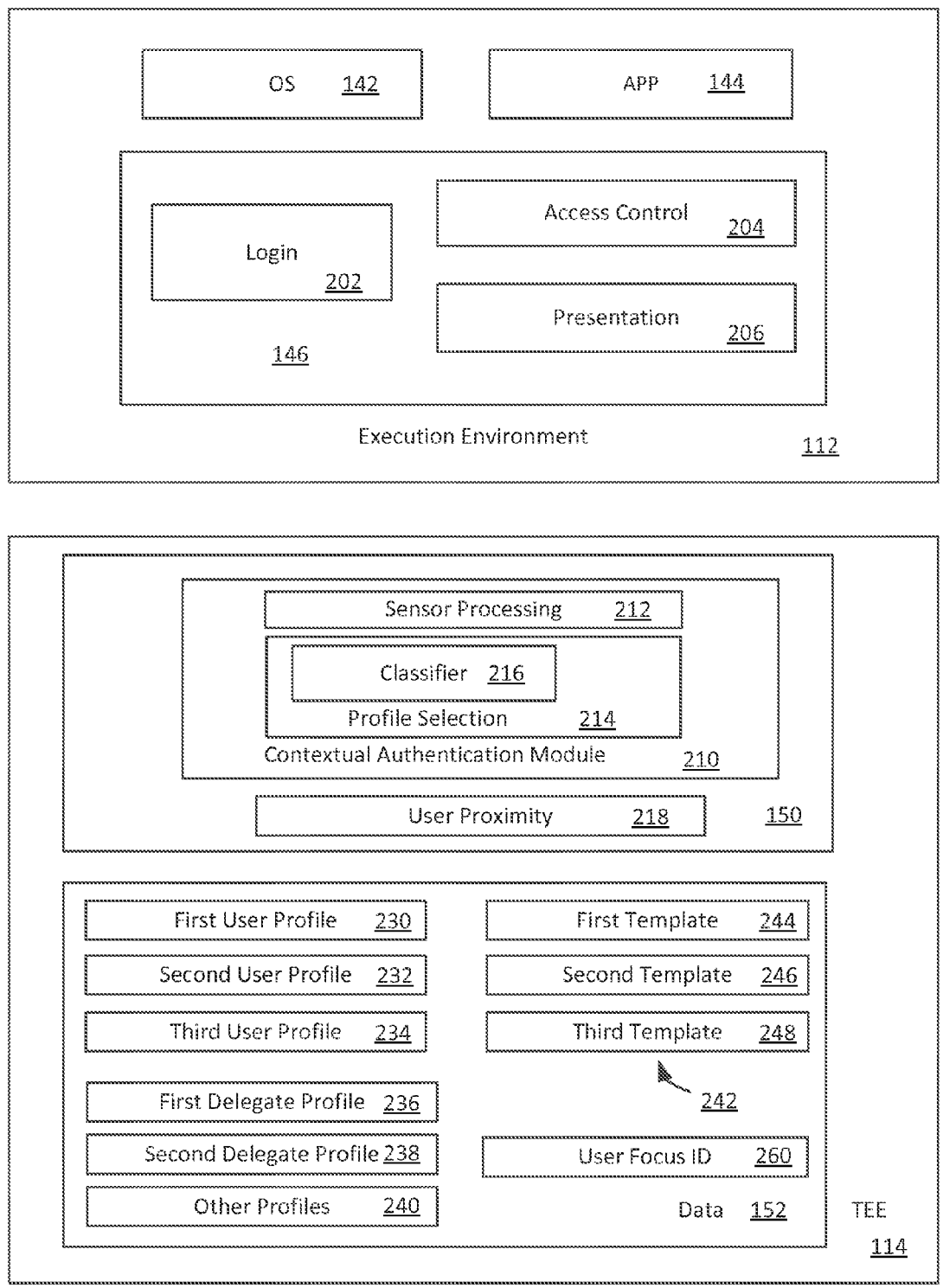
FIG. 2 is a block diagram showing additional components of the computing device shown in FIG. 1, in accordance with various embodiments.

Referring now to FIG. 2, components of the execution environment 112 and TEE 114 are illustrated in further details, in accordance with various embodiments. The modules 146 of the execution environment 112 may include a login module 202, an access control module 204, and a presentation module 206. The secure modules 150 of the TEE 114 may include a contextual authentication module 210 that includes a sensor processing module 212, a profile selection module 214, and a classifier module 216. In various embodiments, the classifier module 216 may classify data based on sensor output, application usage patterns, or user interface interaction patterns in a manner such that the data may be associated with particular users and the classifications of particular sensor data patterns, application usage patterns, or user interface interaction patterns may be considered to be user characteristics such that when a user characteristic changes it may be inferred that a user of the computing device 100 has changed. The classifier module 216 may be a machine learning classifier in various embodiments. Embodiments may also include a user proximity module 218 as a part of the secure modules 150 in the TEE 114. Together, these modules 202, 204, 206, 150, 210, 212, 214 and 216 may cooperate with each other to enable the shared application 144 and operating system 142 to enforce respective access rights simultaneously for the plurality of users, including continuous maintenance of a passively authenticated context for each of the plurality of users.

In embodiments, the data 152 stored in the TEE 114 may include a first user profile 230, a second user profile 232, a third user profile 234, a first delegate profile 236, a second delegate profile 238, or one or more additional profiles 240 in various embodiments. User profiles are a way for users to have a more personalized and streamlined user experience. Profiles allow users to have their own set of applications, social logins, bookmarks, and data in one easily accessible and private place. They may be used to create guest profiles, allowing others to borrow a device without worrying about application or social login conflicts and data privacy. Profiles may also be used to restrict content for use by children to allow parental control of browsing, application usage, and in-app purchasing. In embodiments, automatic device state based profile settings may be applied on a per-application and a per-service basis. For example, the contextual authentication module 210 may distinguish user one 170 using social networking application A hosted by social network server 164, users two and three using video streaming service B hosted by media server 162, etc., and manage specific profiles for each. In embodiments, this automatic management of specific profiles may be combined with machine learning of user characteristics, interactions, or behaviors during shared and/or single user sessions to tune the profile-controlled behavior for the applications and services to the user or combination of users. Preferences may be inferred for combinations of users, applications, and services from other profiles that involve those users, applications or services in various embodiments.

The data 152 may also include user characteristics templates 242 such as a first template 244, a second template 246, or a third template 248. In embodiments, the user characteristics templates 242 are based on biometric or behaviometric data generated by a machine learning classifier. In various embodiments, the user characteristics templates 242 may be included as a part of the user profiles. For example, the first user profile 230 may contain the first template 244, the second user profile 232 may contain the second template 246, and/or the third user profile 234 may contain the third template 248 in embodiments. The data 152 may also include a user focus identifier 260 in various embodiments.

In embodiments, a biometrics and/or behaviometrics machine learning (ML) classifier or set of classifiers may generate reference sample data suitable for establishing a user identity. In various embodiments, the reference sample data may be generated during a training process and stored as a biometric and/or behaviometric template such as templates 244, 246, or 248. The user characteristics templates 242 may be generated and stored by the classifier module 216 during a training process, for example. During the training process, the classifier module 216 may use machine learning to associate biometric user characteristics such as hand movement, gait, or image patterns based at least in part on sensor data with particular users. Biometric characteristics based on hand movement may be based at least in part on accelerometers or gyroscopes detecting relatively imperceptible movements and characteristics based on gait may be based at least in part on accelerometers or gyroscopes detecting walking characteristics in various embodiments. The classifier module 216 may also use machine learning to associate behaviometric user characteristics such as application usage patterns or user interface interaction patterns with particular users. Alternatively, the user characteristics templates 242 may be generated and stored by other modules or generated by a different computing device and stored on the computing device 100 in other embodiments.

In various embodiments, the login module 202 may be operated by the one or more processors 102 to authenticate a user of the computing device 100. In embodiments, an active authentication factor such as a thumbprint reading using the fingerprint sensor 118 may be used. The access control module 204 may be operated to establish an access control state corresponding to a user profile associated with the authenticated user. For example, if the login module 202 authenticates the first user 170, a first access control state corresponding to the first user profile 230 associated with the first user 170 may be established by the access control module 204. The presentation module 206, operated by the one or more processors 102, may present a resource to the authenticated user based at least in part on the established access control state.

The contextual authentication module 210 may be operated by the one or more processors 102 to detect a user interaction change associated with the computing device 100 that indicates a different user, such as the second user 174, has device focus. The user interaction change may include a change in biometric or behaviometric characteristics determined by processing sensor data or application or user interface usage data in various embodiments, for example. The contextual authentication module 210 may continuously monitor passive authentication factors to detect user characteristics as the computing device 100 is being used such that when a change in user characteristics is detected indicating the computing device 100 is being used by a different user, a user profile may be assigned that corresponds to the current rather than the previous user, or alternatively corresponds to a delegate profile of the previous user that may also be based at least in part upon the current user. The sensor processing module 212 may process a sensor output from the motion sensor 116 and generate the user focus identifier 260 indicating the second user 174 has device focus, for example. The profile selection module 214 may be operated by the one or more processors 102 to select the second user profile 232 based on the user focus identifier 260 and the second template 246. In embodiments, the contextual authentication module 210 may include a biometrics and/or behaviometrics ML classifier or set of classifiers as a part of the classifier module 216 that generate sample data suitable for establishing a user identity based at least in part on user characteristics.

Reference sample data such as may be stored in templates 244, 246, or 248 may be used to compare with the sampled data to determine a user match. This may include a match of a first user, a second user, or both users, for example. The contextual authentication module 210 may also include a first user focus context classifier and a second user focus context classifier that determines when a user has device focus. Device focus may be established when a user is observing content on a display or other content rendering device, or when the user is inputting data through an input device such as a computer keyboard, mouse, microphone or camera. The user focus classifiers may establish to the OS which user is logged-in and which user is a delegate of the first.

In various embodiments, the user proximity module 218 may be operated by the one or more processors 102 to determine a proximity status associated with the currently logged in user, such as the first user 170, after the user interaction change associated with the computing device 100 that indicates a different user has device focus is detected by the contextual authentication module 210. The access control module 204 may be operated by the one or more processors 102 to terminate the second access control state if the proximity status reaches a predetermined value. The predetermined value may correspond to an approximate distance, such as greater than thirty feet, for example. Other distances may also be used. An approximate distance of a user from the computing device 100 may be determined using power levels associated with a received signal strength indicator (RSSI) or by using a geographic positioning system (GPS) location, for example. In embodiments, the user proximity module 218 may detect a proximity status regardless of whether a user interaction change has been detected.

Figure 3:
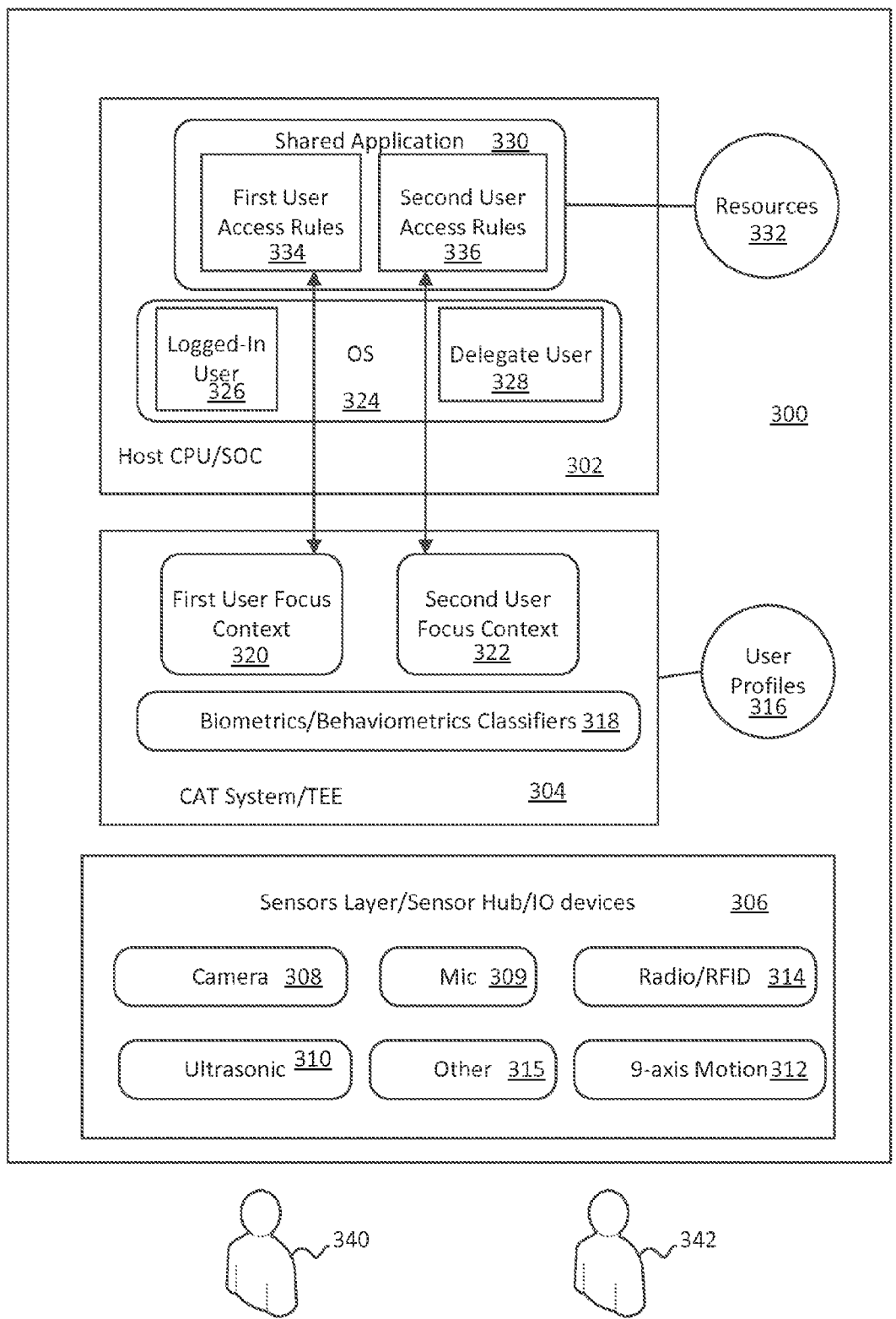
FIG. 3 is a block diagram of a computing device, in accordance with various embodiments.

Referring now to FIG. 3, various embodiments of a computing device 300 may include a host system on a chip (SOC) 302 in data communication with a contextual authentication technology (CAT) system 304 operating in a TEE. The host SOC 302 may include a processor or processing cores, memory, graphics, virtualization, and other capabilities suitable for hosting an operating system (OS) and applications. In embodiments, some or all elements of SOC 302 may be implemented as separate components rather than being integrated on a SOC. The CAT system 304 may be in signal communication with a sensor layer 306.

In embodiments, the sensor layer 306 may include a sensor hub, one or more sensor devices, an input/output (IO) subsystem that may include IO controllers, internet protocol (IP) blocks, and control logic. The sensor layer 306 may also include trusted IO technology that hardens the IO path between the sensor hub and/or sensor devices and a TEE subsystem. Sensor devices may employ a variety of sensing technology and may include a video camera 308, a microphone 309, an ultrasonic sensor 310, a multi-axis motion sensor 312, a wireless radio 313, and an RFID sensing device 314 in various embodiments. Additional or alternative sensors may also be included in embodiments.

In various embodiments, the CAT system 304 may be implemented in a TEE and be in data communication with one or more user profiles 316. Hosting the CAT system in a TEE may provide additional protection against malware attacks that may exist on the host system OS or applications. The CAT system 304 may include biometric or behaviometric machine learning (ML) classifiers 318 that may be used to generate sample data suitable for establishing a user identity based at least in part on user characteristics such as biometric or behaviometric information. Reference sample data based at least in part on user characteristics and stored in the user profiles 316 may be used to compare with the generated sample data to determine a match of a first user, a second user, or both users. The CAT system 304 may also include a first user focus context classifier 320 and a second user focus context classifier 322 that may determine when a user has device focus. Device focus may be established when a user is observing content on a display or other content rendering device, or when a user is inputting data through an input device such as a computer keyboard, mouse, microphone or camera. The user focus context classifiers 320, 322 may establish to the OS which user is logged-in and which user is a delegate of the other. In embodiments, the biometric and/or behaviometric ML classifiers 318, the first user focus context classifier 320, and the second user focus context classifier 322 may be included as a part of the contextual authentication module 210 as discussed with respect to FIG. 2.

In various embodiments, the computing device 300 may be a tablet computing device and as a user picks up the computing device 300, the CAT system 304 employs one or more sensors in combination with the ML classifiers 318 to determine who is attempting to use the computing device 300. When the user is authenticated, the CAT system 304 may access the relevant user profile. If an unknown user is detected or the CAT system 304 cannot detect a particular user with a predetermined confidence level, the CAT system 304 may offer access to a guest profile.

The host SOC 302 may host an OS 324 that may allow operation based on user profiles, indicated in FIG. 3 as a logged-in user 326 and a delegate user 328. The host SOC 302 may host a shared application 330 that allows for varying access to one or more resources 332 based on access rules such as first user access rules 334 and second user access rules 336. The shared application 330 may have access to resources 332 that may be consumed (viewed, modified, deleted) by a logged-in user or by a delegate user. A first user 340 and a second user 342 may share the computing device 300 and each have a user profile stored with the user profiles 316 as well as a biometric or behaviometric classifier stored with the classifiers 318. The shared application 330 and the operating system 324 may enforce the first user access rules 334 and the second user access rules 336 for the first user 340 and the second user 342. The CAT system 304 may maintain a continuous authenticated context for both the first and second users using passive authentication based at least in part on user characteristics such as biometric or behaviometric information rather than requiring an active authentication factor for every user switch. The logged-in user 326 may access the resources 332 with a set of resource access rights while the delegate user 328 may access the resources 332 with a different set of access rights. In various embodiments, some or all of the components of the computing device 300 may be included as a part of the computing device 100 described with respect to FIGS. 1 and 2.

Figure 4:
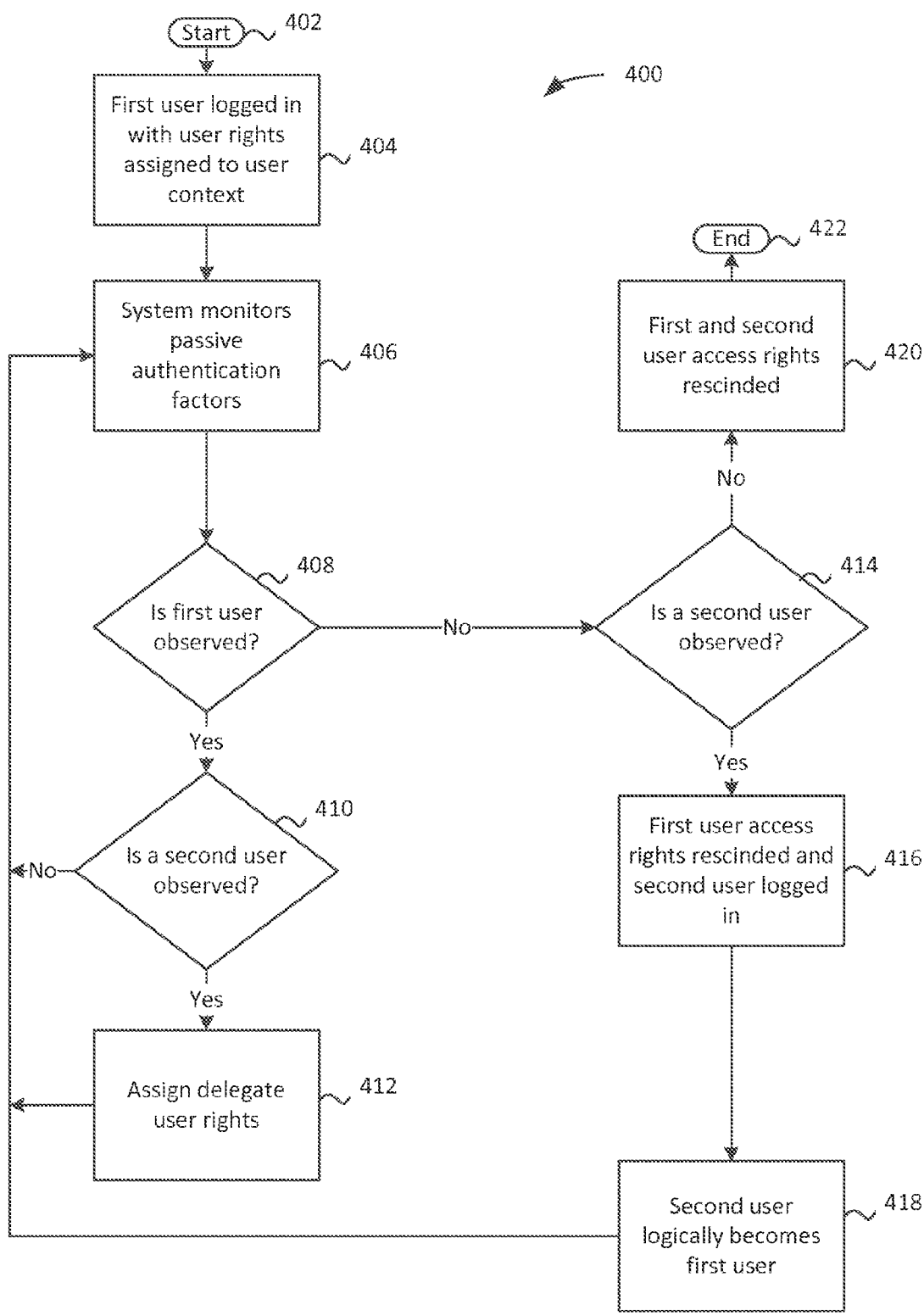
FIG. 4 is a flow diagram of an example process that may be implemented on various computing devices described herein, in accordance with various embodiments

FIG. 4 depicts an example process 400 for simultaneously managing access rights of multiple users that may be implemented by the computing device 100 or the computing device 300 described with respect to FIGS. 1-3 in accordance with various embodiments. In various embodiments, the process 400 may be performed by the login module 202, access control module 204, presentation module 206, sensor processing module 212, profile selection module 214, classifier module 216 and/or user proximity module 218. In other embodiments, the process 400 may be performed with more or less modules and/or with some operations in different order. As shown, for the embodiments, the process 400 may start at a block 402. At operation, 404, a first user log-in may be facilitated, and user rights corresponding to a user profile associated with the first user may be assigned to a user context. This may be performed by accepting a presentation of the first user's thumbprint at the fingerprint sensor 118 such that the login module 202 may access the first user profile 230 and the access control module 204 may assign user access rights corresponding to the first user profile 230, for example. The first user may then be able to access resources such as local resources 158 or resources served or streamed from local server 160, media server 162, or social network server 164 based at least in part on the user access rights assigned by the access control module 204.

At operation 406, the computing device 100 may monitor passive authentication factors in a continuous manner. This may be performed by the sensor processing module 212 of the contextual authentication module 210 monitoring the motion sensor 116 and the classifier module 216 generating biometric or behaviometric sample data based at least in part on output from the motion sensor 116, for example. Multiple sensors may be monitored in embodiments or behavioral factors may be used instead of or in addition to biometric factors. Passive authentication factors may include any combination of biometric or behaviometric authentication factors in various embodiments. For example, in embodiments, biometric authentication factors may include without limitation hand movement or gait characteristics based at least in part on motion sensor data, image patterns based at least in part on camera data, or user characteristics based at least in part on ultrasonic or infrared sensor data. Behaviometric authentication factors may include, without limitation, patterns of application usage or patterns of user interface interaction in various embodiments.

At a decision block 408, it may be determined whether the first user is observed. This may be performed by the profile selection module 214 comparing biometric data generated by the classifier module 216 or the biometric ML classifier 318 at least partially based on information from the motion sensor 116 or 312 to reference data stored in the template 244, for example. The sample and reference biometric or behaviometric data compared by the profile selection module 214 may be based at least in part on any combination of sensor data or behavioral patterns in various embodiments and is not limited to information from the motion sensor 116 or 312.

If the first user is observed, it may be determined at a decision block 410 whether a second user is observed. This may be performed by the profile selection module 214 comparing biometric data generated by the classifier module 216 or the biometric ML classifier 318 to reference data stored in the second template 246 and the third template 248, for example. If a second user is observed, delegate user rights may be assigned to a second user context at a block 412 in various embodiments. This may be performed by the profile selection module 214 selecting the first delegate profile 236 based at least in part on the reference data in the second template 246 and biometric data generated by the biometric ML classifier 318, for example. The second user may then be able to consume one or more resources based at least in part on the assigned delegate user rights in various embodiments. Resource access rights may overlap between a logged-in user and a delegate of the logged-in user to support resource sharing (e.g., both may view a common display while consuming content). However, differential rights may also be enforced in some cases such as a delegate user may not be able to modify a file while having an input focus whereas a logged-in user may be able to modify a file while having input focus, for example. If, at the decision block 410, a second observer was not observed, the process 400 may loop back to the operation 406 such that the monitoring of passive authentication factors continues.

In embodiments, if at the decision block 408, the first user is not observed, it may be determined at a decision block 414 whether a second user is observed. If a second user is observed at the decision block 414, the first user access rights may be rescinded at a block 416. This may be performed by the access control module 204 based at least in part on data from the profile selection module 210, for example. The block 416 may also include logging in the second user and assigning user rights corresponding to a user profile associated with the second user. This may involve an active authentication factor such as a thumbprint presented at the fingerprint sensor 118, in embodiments. The second user may then, at a block 418, logically become the first user for purposes of the logic of the process 400. In embodiments, if, at the decision block 414, a second user is not observed, first and second user rights may be rescinded at a block 420. This may be performed by the access control module 204, in embodiments. The process 400 may end at a block 422 after the first and second user access rights are rescinded. Although not shown, in embodiments, the process 400 may proceed to a state following the end block 422 where the system monitors for active authentication factors such as a thumbprint or a password as may occur if the process returned to the start block 402, for example.

Figure 5:
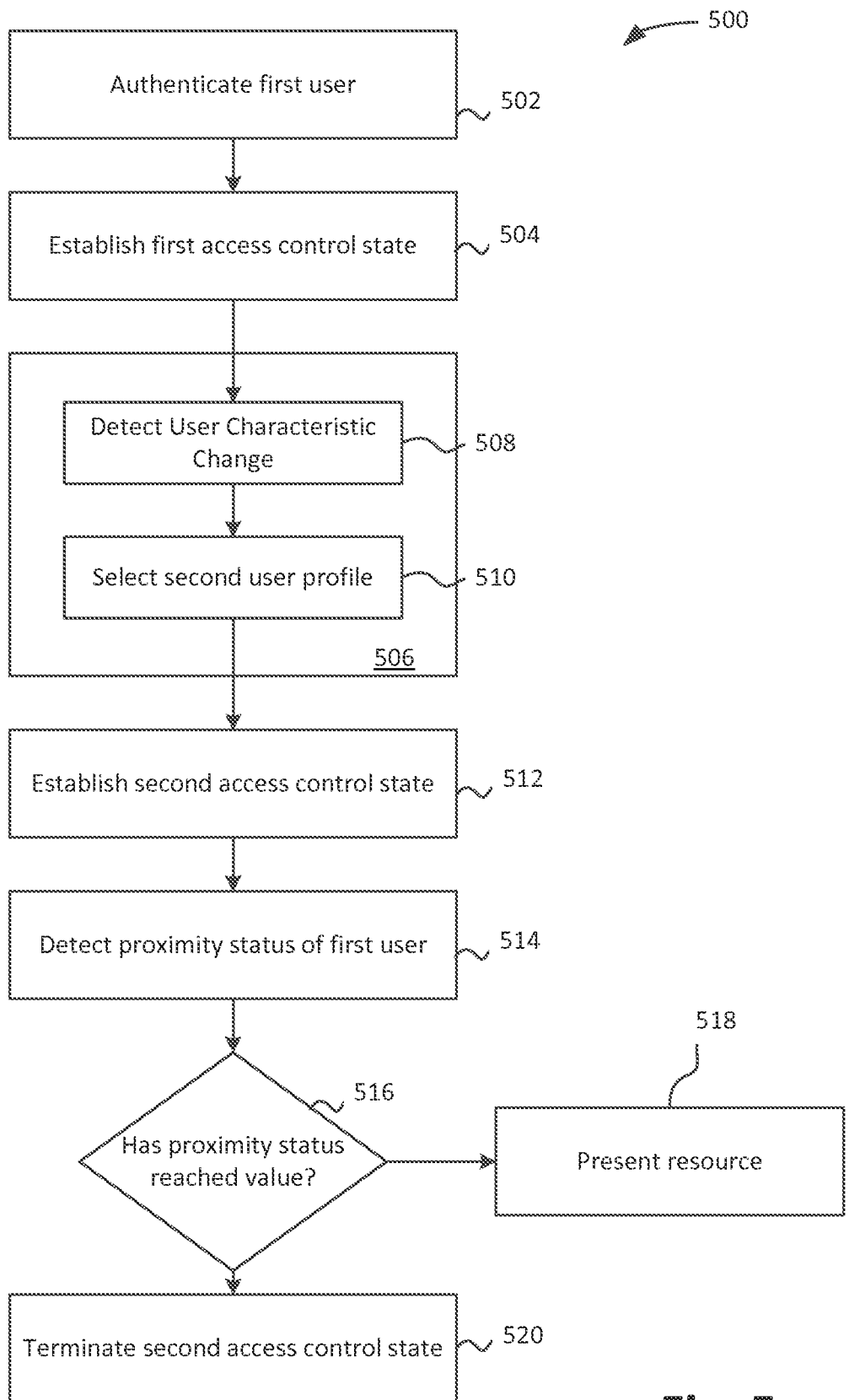
FIG. 5 is a flow diagram of an example process that may be implemented on various computing devices described herein, in accordance with various embodiments.

FIG. 5 depicts an example process 500 for presenting resources that may be implemented by the computing device 100 or 300 in accordance with various embodiments. The process 500 may be performed by e.g., earlier described login module 202, access control module 204, presentation module 206, sensor processing module 212, profile selection module 214, classifier module 216 and/or user proximity module 218. In alternate embodiments, the process 500 may be performed by more or less modules, and/or in different order. At operation 502, a first user of the computing device 100, such as the first user 170, may be authenticated and a first user profile corresponding to the first user may be selected. This may occur by presentation of a thumbprint to the fingerprint reader 118 or user input of an authentication password in embodiments. At block 504, a first access control state corresponding to a first user profile associated with the first user may be established. For example, a first access control state corresponding to the first user profile 230 associated with the first user 170 may be established by the access control module 204.

At operation 506, a second user profile may be selected that indicates a different user, such as the second user 174, has device focus. In various embodiments, selecting the second user profile may include detecting a user characteristic change at a block 508 and selecting a second user profile at a block 510 based at least in part on the detected user characteristic change. Selecting the second user profile at the block 510 may also be based at least in part on the first user profile such that the second user profile may be a delegate profile relating to the first user profile.

In embodiments, detecting a user characteristic change at the block 508 may include monitoring one or more sensors such as the motion sensor 116, the microphone 122, the camera 128, or the ultrasonic sensor 310, for example. Detecting a user characteristic change may further include receiving a sensor output, such as from the motion sensor 116 at a block 508 and classifying the output such as with the classifier module 216 to determine whether characteristics such as biometric or behaviometric characteristics of the current user have changed. A In embodiments, a movement of the computing device 100 or 300 may be detected that indicates the computing device has been picked up or has been passed from one person to another as a part of detecting a user characteristic change at the block 508.

Selecting a second user profile at the block 510 may also be based at least in part on the sensor output and a previously stored template based at least in part on biometric information associated with the second user, the template generated by a machine learning classifier. The template may include biometric reference sample data such as that described with respect to template 246 that may be generated by the classifier module 216 during a training process, for example. In embodiments, receiving the sensor output may be performed by the sensor processing module 212 and selecting the user profile may be performed by the profile selection module 214, for example. At a block 512, a second access control state based at least in part on the second user profile may be established. This may be performed by the access control module 204, for example. In embodiments, the second access control state may be based at least in part on a delegate user profile.

In various embodiments, a proximity status associated with the first user may be determined at a block 514 after establishing the second access control state. This may be performed by the user proximity module 218 based at least in part on information received from the Bluetooth enabled device 180 received by the sensor processing module 212, for example. At a decision block 516, it may be determined whether the proximity status has reached a predetermined value. For example, it may be determined whether the proximity status has reached a level corresponding to greater than approximately 30 feet away from the computing device 100. If, at the decision block 516, it is determined that the proximity status has not reached the predetermined value, a resource may be presented at a block 518 based at least in part on the second access control state. If, at the decision block 516, it is determined that the proximity status has reached the predetermined value, the second access state may be terminated at a block 520.

Figure 6:
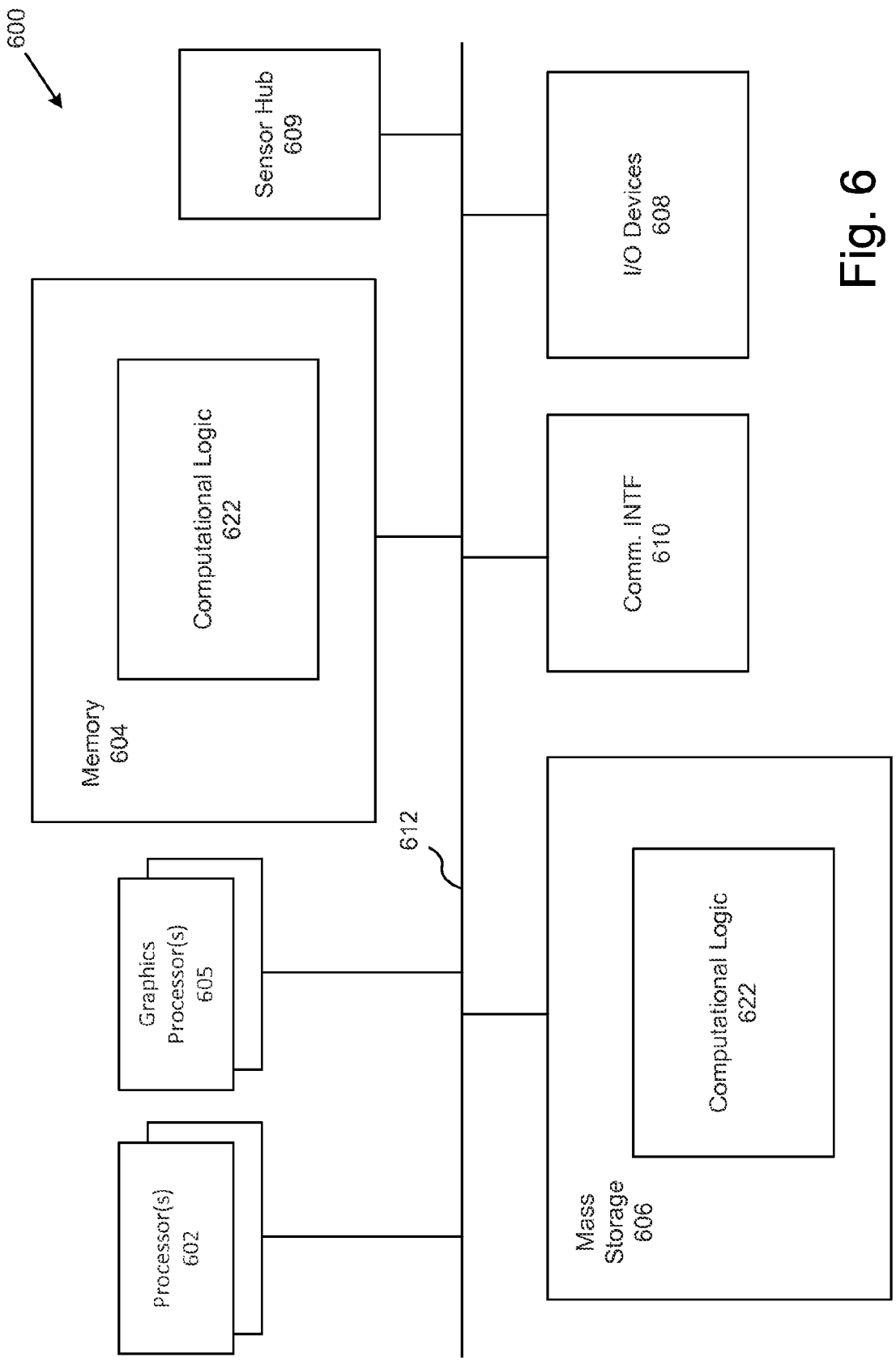
FIG. 6 illustrates an example computing environment suitable for practicing various aspects of the disclosure, in accordance with various embodiments.

Referring now to FIG. 6, an example computer 600 suitable to practice the present disclosure as earlier described with reference to FIGS. 1-3 is illustrated in accordance with various embodiments. As shown, computer 600 may include one or more processors or processor cores 602, and system memory 604. For the purpose of this application, including the claims, the terms "processor" and "processor cores" may be considered synonymous, unless the context clearly requires otherwise. Additionally, computer 600 may include one or more graphics processors 605, mass storage devices 606 (such as diskette, hard drive, compact disc read only memory (CD-ROM) and so forth), input/output devices 608 (such as display, keyboard, cursor control, remote control, gaming controller, image capture device, and so forth), sensor hub 609 that may function in a similar manner as that described with respect to sensor hub 108 of FIG. 1, and communication interfaces 610 (such as network interface cards, modems, infrared receivers, radio receivers (e.g., Bluetooth), and so forth). The elements may be coupled to each other via system bus 612, which may represent one or more buses. In the case of multiple buses, they may be bridged by one or more bus bridges (not shown).

Each of these elements may perform its conventional functions known in the art. In particular, system memory 604 and mass storage devices 606 may be employed to store a working copy and a permanent copy of the programming instructions implementing the operations associated with the computing device 100 or the computing device 300, e.g., operations described for modules 146, 150, 202, 204, 206, 210, 212, 214, 216, 218, 318, 320, and 322 shown in FIG. 1-3, or operations shown in process 400 of FIG. 4 or process 500 of FIG. 5, collectively denoted as computational logic 622. The system memory 604 and mass storage devices 606 may also be employed to store a working copy and a permanent copy of the programming instructions implementing the operations associated with the OS 142, the application 144, the OS 324, and the application 330. The system memory 604 and mass storage devices 606 may also be employed to store the data 152, the local resources 158, the user profiles 316, and the resources 332. The various elements may be implemented by assembler instructions supported by processor(s) 602 or high-level languages, such as, for example, C, that can be compiled into such instructions.

The permanent copy of the programming instructions may be placed into mass storage devices 606 in the factory, or in the field, through, for example, a distribution medium (not shown), such as a compact disc (CD), or through communication interface 610 (from a distribution server (not shown)). That is, one or more distribution media having an implementation of the agent program may be employed to distribute the agent and program various computing devices.

The number, capability and/or capacity of these elements 608-612 may vary, depending on whether computer 600 is a stationary computing device, such as a set-top box or desktop computer, or a mobile computing device such as a tablet computing device, laptop computer or smartphone. Their constitutions are otherwise known, and accordingly will not be further described.

Figure 7:
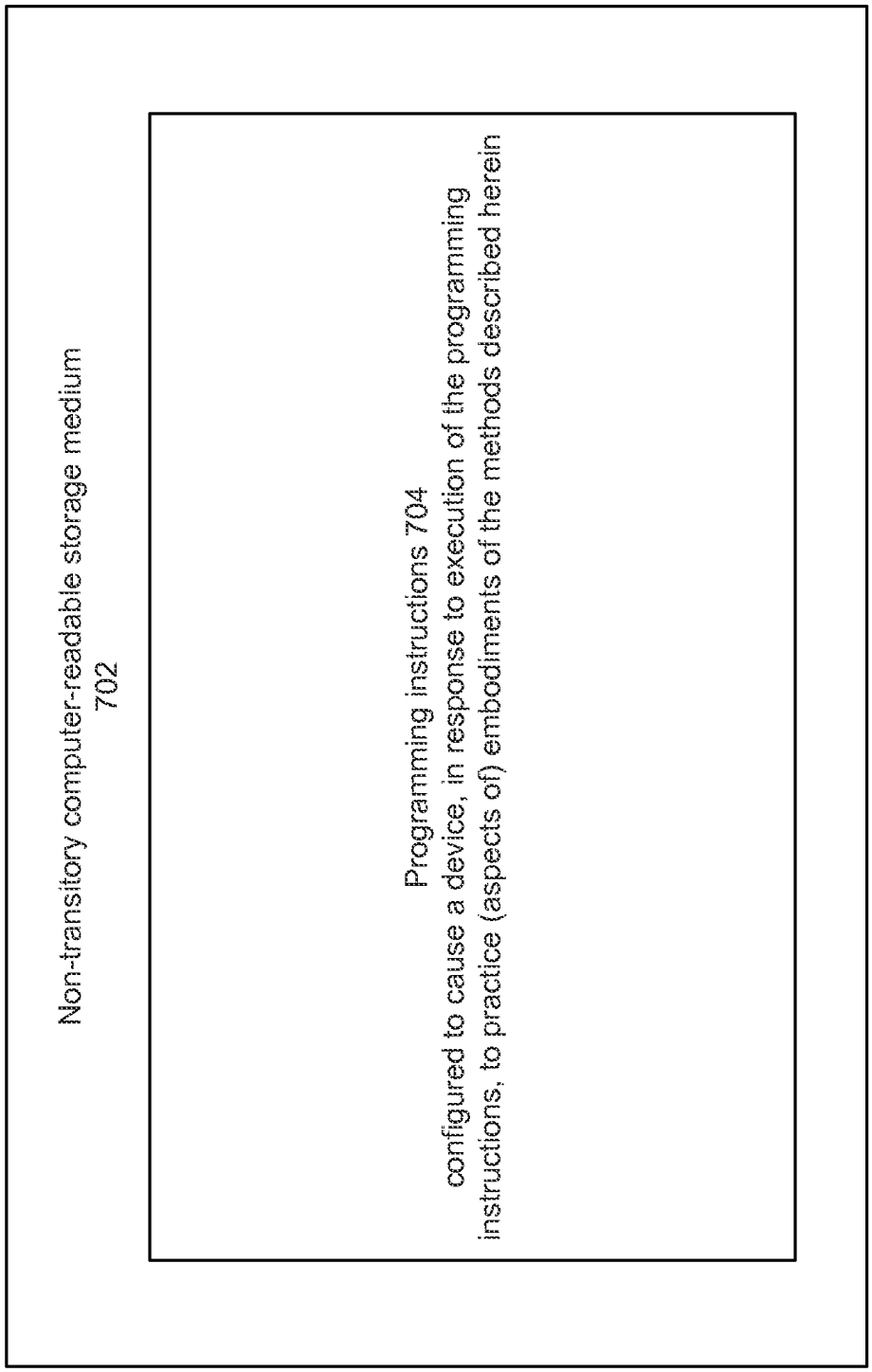
FIG. 7 illustrates an example storage medium with instructions configured to enable an apparatus to practice various aspects of the present disclosure, in accordance with various embodiments.

FIG. 7 illustrates an example at least one non-transitory computer-readable storage medium 702 having instructions configured to practice all or selected ones of the operations associated with the computing device 100 or the computing device 300, earlier described, in accordance with various embodiments. As illustrated, at least one computer-readable storage medium 702 may include a number of programming instructions 704. The storage medium 702 may represent a broad range of persistent storage medium known in the art, including but not limited to flash memory, dynamic random access memory, static random access memory, an optical disk, a magnetic disk, etc. Programming instructions 704 may be configured to enable a device, e.g., computer 600, computing device 100, or computing device 300, in response to execution of the programming instructions, to perform, e.g., but not limited to, various operations described for modules 146, 150, 202, 204, 206, 210, 212, 214, 216, 218, 318, 320, and 322 shown in FIG. 1-3, or operations of process 400 of FIG. 4 or process 500 of FIG. 5. In alternate embodiments, programming instructions 704 may be disposed on multiple computer-readable storage media 702.

Referring back to FIG. 6, for an embodiment, at least one of processors 602 may be packaged together with memory having computational logic 622 configured to practice aspects described for modules 146, 150, 202, 204, 206, 210, 212, 214, 216, 218, 318, 320, and 322 shown in FIG. 1-3, or operations of process 400 or FIG. 4 or process 500 of FIG. 5. For an embodiment, at least one of processors 602 may be packaged together with memory having computational logic 622 configured to practice aspects described for modules 146, 150, 202, 204, 206, 210, 212, 214, 216, 218, 318, 320, and 322 shown in FIG. 1-3, or operations of process 400 of FIG. 4 or process 500 of FIG. 5 to form a System in Package (SiP). For an embodiment, at least one of processors 602 may be integrated on the same die with memory having computational logic 622 configured to practice aspects described for modules 146, 150, 202, 204, 206, 210, 212, 214, 216, 218, 318, 320, and 322 shown in FIG. 1-3, or operations of process 400 of FIG. 4 or process 500 of FIG. 5. For an embodiment, at least one of processors 602 may be packaged together with memory having computational logic 622 configured to practice aspects of process 400 of FIG. 4 or process 500 of FIG. 5 to form a System on Chip (SoC). For at least one embodiment, the SoC may be utilized in, e.g., but not limited to, a mobile computing device such as a computing tablet and/or a smartphone.

Machine-readable media (including non-transitory machine-readable media, such as machine-readable storage media), methods, systems and devices for performing the above-described techniques are illustrative examples of embodiments disclosed herein. Additionally, other devices in the above-described interactions may be configured to perform various disclosed techniques.

EXAMPLES

Some non-limiting examples are:

Example 1 may include a computing device comprising: one or more processors; a memory coupled with the one or more processors; a login module operated by the one or more processors to authenticate a first user of the device and establish a first access control state corresponding to a first user profile associated with the first user; a contextual authentication module operated by the one or more processors to select a second user profile based at least in part on a changed user characteristic; and a presentation module operated by the one or more processors to present a resource based at least in part on the second user profile.

Example 2 may include the subject matter of Example 1, wherein the computing device further comprises a sensor, and wherein the contextual authentication module comprises: a profile selection module operated by the one or more processors to select the second user profile based at least in part on an output of the sensor and a previously stored template generated by a machine learning classifier.

Example 3 may include the subject matter of Example 2, wherein the sensor is a motion sensor and wherein the profile selection module comprises a biometric machine learning classifier, wherein the profile selection module is to perform a biometric information classification of the output of the sensor and select the second user profile based at least in part on the biometric information classification and the previously stored template.

Example 4 may include the subject matter of any one of Examples 1-3, wherein the login module is to authenticate the first user of the device based at least in part on an active authentication factor.

Example 5 may include the subject matter of any one of Examples 1-4, wherein the computing device further comprises: an access control module operated by the one or more processors to establish a second access control state based at least in part on the second user profile; and a user proximity module operated by the one or more processors to determine a proximity status associated with the first user, wherein the access control module is operated by the one or more processors to terminate the second access control state if the proximity status reaches a predetermined value.

Example 6 may include the subject matter of any one of Examples 1-5, wherein the computing device further comprises a trusted execution environment operated by one of the processors to host operation of the contextual authentication module.

Example 7 may include the subject matter of any one of Examples 1-6, wherein the contextual authentication module is operated by the one or more processor to select a delegate profile as the second user profile.

Example 8 may include the subject matter of any one of Examples 1-5, wherein the computing device is a tablet computing device, wherein the contextual authentication module comprises a profile selection module operated by the one or more processors in a trusted execution environment to select a second user profile based at least in part on a previously stored template generated by a machine learning classifier.

Example 9 may include a computer implemented method comprising: authenticating, by a computing device, a first user of the device; establishing, by the computing device, a first access control state corresponding to a first user profile associated with the first user; selecting, by the computing device, a second user profile based at least in part on a changed user characteristic; and presenting, by the computing device, a resource based at least in part on the second user profile.

Example 10 may include the subject matter of Example 9, wherein selecting, by the computing device, the second user profile comprises: receiving, by the computing device, a sensor output; performing a classification of the sensor output to generate sample data; and selecting, by the computing device, the second user profile based at least in part on the sample data and a previously stored template generated by a machine learning classifier.

Example 11 may include the subject matter of Example 10, wherein receiving comprises receiving a sensor output from a motion sensor, wherein performing comprises performing a biometric classification of the motion sensor output to generate biometric sample data, and wherein selecting comprises selecting the second user profile based at least in part on the biometric sample data and a previously stored biometric template generated by a biometric machine learning classifier.

Example 12 may include the subject matter of any one of Examples 9-11, wherein authenticating, by the computing device, the first user of the device is based at least in part on an active authentication factor.

Example 13 may include the subject matter of any one of Examples 9-12, further comprising: establishing, by the computing device, a second access control state based at least in part on the second user profile; determining, by the computing device, a proximity status associated with the first user; and terminating, by the computing device, the second access control state if the proximity status reaches a predetermined value.

Example 14 may include the subject matter of any one of Examples 9-13, wherein selecting, by the computing device, the second user profile based at least in part on the changed user characteristic is performed in a trusted execution environment.

Example 15 may include the subject matter of any one of Examples 9-14, wherein the second user profile is a delegate profile.

Example 16 may include the subject matter of any one of Examples 9-13, wherein the computing device is a tablet computing device, wherein selecting, by the computing device, the second user profile based at least in part on the changed user characteristic comprises selecting in a trusted execution environment, by the computing device, a second user profile based at least in part on a previously stored template generated by a machine learning classifier.

Example 17 may include at least one non-transitory computer-readable medium comprising instructions stored thereon that, in response to execution of the instructions by a computing device, cause the computing device to: authenticate a first user of the device; establish a first access control state corresponding to a first user profile associated with the first user; select a second user profile based at least in part on a changed user characteristic; and present a resource based at least in part on the second user profile.

Example 18 may include the subject matter of Example 17, wherein to select the second user profile, the computing device is caused to: perform a classification of a sensor output to generate sample data; and select a second user profile based at least in part on the sample data and a previously stored template generated by a machine learning classifier.

Example 19 may include the subject matter of Example 18, wherein the computing device is caused to perform a biometric classification of a motion sensor output to generate biometric sample data and wherein the computing device is caused to select the second user profile based at least in part on the biometric sample data and a previously stored biometric template generated by a biometric machine learning classifier.

Example 20 may include the subject matter of any one of Examples 17-19, wherein the computing device is caused to authenticate the first user of the device based at least in part on an active authentication factor.

Example may include the subject matter of any one of Examples 17-20, wherein the computing device is further caused to: establish a second access control state based at least in part on the second user profile; determine a proximity status associated with the first user; and terminate the second access control state if the proximity status reaches a predetermined value.

Example may include the subject matter of any one of Examples 17-21, wherein the computing device is further caused to select the second user profile in a trusted execution environment.

Example 23 may include the subject matter of any one of Examples 17-22, wherein the computing device is further caused to select a delegate profile as the second user profile.

Example 24 may include the subject matter of any one of Examples 17-21, wherein the computing device is a tablet computing device, wherein the tablet computing device is caused to select the second user profile in a trusted execution environment of the tablet computing device based at least in part on a previously stored template generated by a machine learning classifier.

Example 25 may include a computing device comprising: means for authenticating a first user of the device; means for establishing a first access control state corresponding to a first user profile associated with the first user; means for selecting a second user profile based at least in part on a changed user characteristic; and means for presenting a resource based at least in part on the second user profile.

Example 26 may include the subject matter of Example 25, wherein the means for selecting the second user profile comprises: means for receiving a sensor output; means for performing a classification of the sensor output to generate sample data; and means for selecting the second user profile based at least in part on the sample data and a previously stored template generated by a machine learning classifier.

Example 27 may include the subject matter of Example 26, wherein the means for receiving comprises means for receiving a sensor output from a motion sensor, wherein the means for performing comprises means for performing a biometric classification of the motion sensor output to generate biometric sample data, and wherein the means for selecting comprises means for selecting the second user profile based at least in part on the biometric sample data and a previously stored biometric template generated by a biometric machine learning classifier.

Example 28 may include the subject matter of any one of Examples 25-27, wherein the means for authenticating the first user of the device is based at least in part on an active authentication factor.

Example 29 may include the subject matter of any one of Examples 25-28, further comprising: means for establishing a second access control state based at least in part on the second user profile; means for determining a proximity status associated with the first user; and means for terminating the second access control state if the proximity status reaches a predetermined value.

Example 30 may include the subject matter of any one of Examples 25-29, wherein the means for selecting the second user profile based at least in part on the changed user characteristic is in a trusted execution environment.

Example 31 may include the subject matter of any one of Examples 25-30, wherein the second user profile is a delegate profile.

Example 32 may include the subject matter of any one of Examples 25-29, wherein the computing device is a tablet computing device, wherein the means for selecting the second user profile based at least in part on the changed user characteristic comprises means for selecting in a trusted execution environment a second user profile based at least in part on a previously stored template generated by a machine learning classifier.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. A computing device comprising:
   one or more processors;
   a memory coupled with the one or more processors;
   a login module operated by the one or more processors to authenticate a first user of the device and establish a first access control state corresponding to a first user profile associated with the first user and to authenticate a second user of the device and establish a second access control state corresponding to a second user profile associated with the second user;
   a contextual authentication module operated by the one or more processors to select between the first and second user profiles based at least in part on a changed user characteristic;
   a presentation module operated by the one or more processors to present a resource based at least in part on the second user profile; and
   a motion sensor, wherein
   the contextual authentication module comprises a profile selection module operated by the one or more processors to select between the first and second user profiles based at least in part on an output of the motion sensor and previously stored first and second templates generated by a machine learning classifier in association with the respective first and second users, and
   the profile selection module comprises a biometric machine learning classifier, wherein the profile selection module is to perform a biometric information classification of the output of the motion sensor and select between the first and second user profiles based at least in part on the biometric information classification and the previously stored first and second templates.

2. The computing device of claim 1, wherein the login module is to authenticate the first and second users of the device based at least in part on an active authentication factor.

3. The computing device of claim 1, wherein the computing device further comprises:
   a user proximity module operated by the one or more processors to determine a proximity status associated with the first user, wherein an access control module is operated by the one or more processors to terminate the second access control state if the proximity status reaches a predetermined value.

4. The computing device of claim 1, further comprising a trusted execution environment operated by one of the processors to host operation of the contextual authentication module.

5. The computing device of claim 1, wherein the contextual authentication module is operated by the one or more processors to select a delegate profile as the second user profile.

6. The computing device of claim 1, wherein the computing device is a tablet computing device, wherein the contextual authentication module comprises a profile selection module operated by the one or more processors in a trusted execution environment to select between the first and second user profiles based at least in part on the previously stored first and second templates generated by the biometric machine learning classifier.

7. A computer implemented method comprising:
authenticating, by a computing device, a first user of the device;
establishing, by the computing device, a first access control state corresponding to a first user profile associated with the first user;
selecting, by the computing device, a second user profile associated with a second user of the device based at least in part on a changed user characteristic, wherein selecting the second user profile includes:
receiving, by the computing device, a motion sensor output;
performing a biometric classification of the motion sensor output to generate biometric sample data; and
selecting, by the computing device, the second user profile based at least in part on the biometric sample data generated from the motion sensor output and a previously stored biometric template generated by a machine learning classifier in association with the second user; and
presenting, by the computing device, a resource based at least in part on the second user profile.

8. The method according to claim 7, wherein authenticating, by the computing device, the first user of the device is based at least in part on an active authentication factor.

9. The method according to claim 7, further comprising:
establishing, by the computing device, a second access control state based at least in part on the second user profile;
determining, by the computing device, a proximity status associated with the first user; and
terminating, by the computing device, the second access control state if the proximity status reaches a predetermined value.

10. The method according to claim 7, wherein selecting, by the computing device, the second user profile based at least in part on the changed user characteristic is performed in a trusted execution environment.

11. The method according to claim 7, wherein the second user profile is a delegate profile.

12. The method according to claim 7, wherein the computing device is a tablet computing device, wherein selecting, by the computing device, the second user profile based at least in part on the changed user characteristic comprises selecting in a trusted execution environment, by the computing device, a second user profile based at least in part on a previously stored template generated by a machine learning classifier.

13. At least one non-transitory computer-readable medium comprising instructions stored thereon that, in response to execution of the instructions by a computing device, cause the computing device to:
authenticate a first user of the device;
establish a first access control state corresponding to a first user profile associated with the first user;
select a second user profile associated with a second user of the device based at least in part on a changed user characteristic, including to perform a biometric classification of a motion sensor output to generate biometric sample data and to select a second user profile based at least in part on the biometric sample data and a previously stored template generated by a biometric machine learning classifier in association with the second user; and
present a resource based at least in part on the second user profile.

14. The at least one non-transitory computer-readable medium of claim 13, wherein the computing device is caused to authenticate the first user of the device based at least in part on an active authentication factor.

15. The at least one non-transitory computer-readable medium of claim 13, wherein the computing device is further caused to:
establish a second access control state based at least in part on the second user profile;
determine a proximity status associated with the first user; and
terminate the second access control state if the proximity status reaches a predetermined value.

16. The at least one non-transitory computer-readable medium of claim 13, wherein the computing device is further caused to select the second user profile in a trusted execution environment.

17. The at least one non-transitory computer-readable medium of claim 13, wherein the computing device is further caused to select a delegate profile as the second user profile.

18. The at least one non-transitory computer-readable medium of claim 13, wherein the computing device is a tablet computing device, wherein the tablet computing device is caused to select the second user profile in a trusted execution environment of the tablet computing device based at least in part on a previously stored template generated by a machine learning classifier.

* * * * *